(12) United States Patent
Srivastava et al.

(10) Patent No.: US 11,195,113 B2
(45) Date of Patent: Dec. 7, 2021

(54) EVENT PREDICTION SYSTEM AND METHOD

(71) Applicant: Tata Consultancy Services Limited, Mumbai (IN)

(72) Inventors: Rajiv Radheyshyam Srivastava, Pune (IN); Girish Keshav Palshikar, Pune (IN); Sachin Pawar, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 720 days.

(21) Appl. No.: 15/214,062

(22) Filed: Jul. 19, 2016

(65) Prior Publication Data

US 2017/0154276 A1 Jun. 1, 2017

(30) Foreign Application Priority Data

Nov. 27, 2015 (IN) .......................... 4467/MUM/2015

(51) Int. Cl.
| | |
|---|---|
| *G06N 7/00* | (2006.01) |
| *G06N 20/00* | (2019.01) |
| *G06Q 10/04* | (2012.01) |
| *G06Q 30/02* | (2012.01) |
| *G06Q 10/06* | (2012.01) |
| *G06Q 10/10* | (2012.01) |

(52) U.S. Cl.
CPC .............. *G06N 7/005* (2013.01); *G06N 20/00* (2019.01); *G06Q 10/04* (2013.01); *G06Q 10/06375* (2013.01); *G06Q 10/1053* (2013.01); *G06Q 30/0202* (2013.01)

(58) Field of Classification Search
CPC .. G06N 7/005; G06N 20/00; G06Q 10/06375; G06Q 10/1053; G06Q 10/04; G06Q 30/0202
See application file for complete search history.

(56) References Cited

U.S. PATENT DOCUMENTS

| | | |
|---|---|---|
| 7,324,954 B2 | 1/2008 | Calderaro et al. |
| 7,367,808 B1 | 5/2008 | Frank et al. |
| 10,140,623 B1* | 11/2018 | Lloyd ................ G06Q 30/0202 |
| 2009/0276289 A1 | 11/2009 | Dickinson et al. |

(Continued)

OTHER PUBLICATIONS

Paishikar, G.K. et al. (2011). "Arrest Attrition with Analytics," located at < http://www.tcs.com/SiteCollectionDocuments/White%20Papers/Innovation_Whitepaper_Arrest_Attrition_Analytics_12_2011.pdf> visited on Jul. 19, 2016,(15 pages).

(Continued)

*Primary Examiner* — Eric Nilsson
(74) *Attorney, Agent, or Firm* — Finnegan, Henderson, Farabow, Garrett & Dunner, LLP

(57) ABSTRACT

Event prediction system and method includes gathering data corresponding to multiple entities to derive multiple entity profiles. Next, a first subset of entity profiles is identified from the multiple entity profiles generated. The identification is done on the basis of characteristics associated with the entities. Subsequent to identification of the first subset of the entity profiles, a second subset of entity profiles is shortlisted. Here, the second subset of entity profiles shows highest probability of occurrence of the event. Further, a determination of a factor that may lead to occurrence of the event is done.

20 Claims, 2 Drawing Sheets

(56) References Cited

U.S. PATENT DOCUMENTS

| | | | | |
|---|---|---|---|---|
| 2011/0307303 | A1* | 12/2011 | Dutta | G06Q 10/00 705/7.42 |
| 2011/0313900 | A1* | 12/2011 | Falkenborg | G06Q 20/227 705/30 |
| 2012/0150779 | A1* | 6/2012 | Vaiciulis | G06Q 40/00 706/21 |
| 2012/0233108 | A1 | 9/2012 | Stober et al. | |
| 2013/0275187 | A1* | 10/2013 | Patel | G06Q 10/06398 705/7.42 |
| 2013/0297373 | A1 | 11/2013 | Proux | |
| 2014/0095201 | A1* | 4/2014 | Farooq | G16H 50/30 705/3 |
| 2015/0294257 | A1* | 10/2015 | Raza | G06Q 10/06398 705/7.42 |
| 2016/0104076 | A1* | 4/2016 | Maheshwari | G06N 20/00 706/12 |
| 2016/0180291 | A1* | 6/2016 | Beck | G06Q 10/1053 705/7.28 |
| 2017/0236081 | A1* | 8/2017 | Grady Smith | G06Q 10/067 705/7.36 |

OTHER PUBLICATIONS

Saradhi, V.V. et al. (Mar. 2011). "Employee Churn Prediction," *Elsevier: Expert Systems with Applications*, vol. 38, pp. 1999-2006.

Singh, M. et al. "An Analytics Approach for Proactively Combating Voluntary Attrition of Employees," *IEEE 12thInternational Conference on Data Mining Workshops*, Dec. 10-12, 2012, Brussels, Belgium; pp. 317-323.

Varshney, K.R. (Mar. 12, 2013), "Proactive Retention of IBM Growth Market Employee," located at < www-950.ibm.com/events/wwe/grp/grp004.nsf/vLookupPDFs/Kush%20Varshney's%20Presentation/$file/Kush%20Varshney's%20Presentation.pdf> visited on Jul. 19, 2016; pp. 1-24.

\* cited by examiner

EVENT PREDICTION SYSTEM AND METHOD

PRIORITY CLAIM

This U.S. patent application claims priority under 35 U.S.C. § 119 to India Application No. 4467/MUM/2015, filed on 27 Nov. 2015. The entire content of the aforementioned application are incorporated herein by reference.

FIELD OF INVENTION

The present subject matter relates to data mining and, particularly but not exclusively, to event prediction using data mining.

BACKGROUND

Predictive analytics is the area of data mining concerned with forecasting probabilities and trends, based on predictive models. A predictive model is made up of a number of predictors that influence future behavior or result of the predictive analytics.

Predictive analytics is used widely in information technology (IT). In spam filtering systems, for example, predictive modeling is sometimes used to identify the probability that a given message is spam. Other applications of predictive modeling include disaster recovery, security management, engineering, meteorology and city planning.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some implementations of systems and/or methods in accordance with implementations of the present subject matter are now described, by way of example, and with reference to the accompanying figure(s), in which.

DETAILED DESCRIPTION

Figure 1:
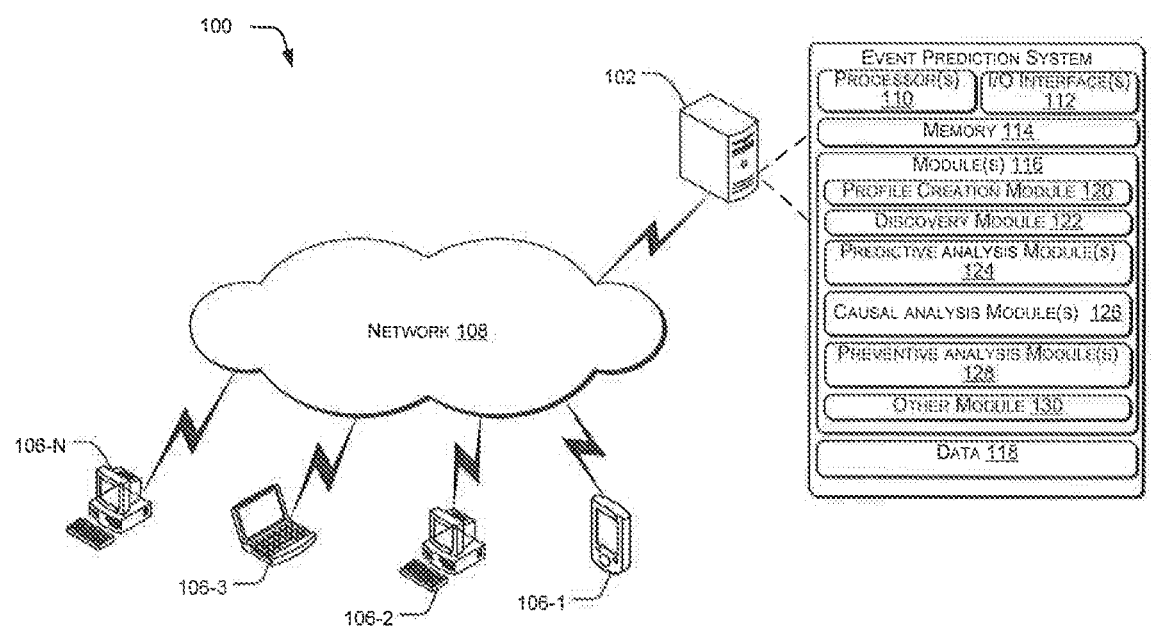
FIG. 1 illustrates a network environment implementing an event prediction system, according to an implementation of the present subject matter.

In predictive analytics, data is collected for relevant predictors and a statistical model for an event is formulated. The predictors can be understood as various factors influencing the event. The statistical model is used to make predictions about future probabilities of the event associated with the predictors. Illustrations of the event can be employee retention, employee attrition, increased sale of car, error in hardware produced, and the like.

General statistical models for predictive analytics utilize complex neural networks, mapped out by sophisticated software in order to make predictions. Such statistical models become complicated to understand and difficult to implement by new and unskilled users, thus wasting a lot of time. Additionally, the conventional statistical models consider a fixed set of predictors and fail to customize the predictive analytics, in accordance with varying user's requirements. Further, such statistical models are limited in functionality since they tend to predict the probability of the occurrence of the event, but fail to compute a cause, leading to the probability of occurrence of the event.

Thus, the conventionally known statistical models make the predictive analytics time consuming, difficult to implement and comprehend by a user.

According to an implementation of the present subject matter, techniques for predicting occurrence of an event and determining factors contributing towards occurrence of the event are described herein. The occurrence of the event may be understood as a probability of occurrence of the event.

In an example implementation of the present subject matter, data corresponding to multiple entities may be gathered to derive entity profiles. The gathered data may indicate characteristics associated with the entities. In an example implementation, entity profiles may be derived corresponding to each entity. In an example of an enterprise, employees may be considered as entities and employee attrition may be considered as the event associated with the entities. Further, the characteristics of each of the entity, in this example, may include details like the employee's education, projects worked on, location, performance, skills, and the like.

In accordance, with the implementation of the present subject matter, data related to each employee may be collected through different mechanisms, like receiving the data from various enterprise workflow automation systems, different repositories, and the like. The data is representative of characteristics associated with employee.

The characteristics may have different categories of the data such as personal, academic, and professional. Here, each of the categories of data may have multiple subcategories, and the subcategories in each of the above mentioned category of data may vary for each employee. For example, for an employee with 5 years of experience in the enterprise, gap between promotions and types of projects handled can be subcategory of category professional. However, for an employee with 2 years of experience, inter-personnel relations and discipline at work may be a subcategory. Thus, the subject matter provides a capability to customize the collection of relevant data corresponding to each employee. Additionally, the subject matter provides a wider coverage of the entity characteristics to be considered. Further, an employee profile may be generated using the collected data, for each of the employee.

Subsequently, a first subset of entity profiles may be shortlisted from amongst the plurality of the entity profiles based on analysis of a first set of characteristics and a predetermined limit. The first set of characteristic may be considered as a subset of the characteristics associated with the entities.

Referring to the example of the enterprise above, a first subset of employee profiles is shortlisted from the generated employee profiles. In an example, the shortlisting may be done, based on comparison of the characteristics, like project working on, location, included within the employee's profiles generated with historical trends observed for each of the characteristics. Here, the historical trends may be derived from the data gathered. Here, the employee profiles with closest map of characteristics are separated. Next, based on a predetermined limit the employee profiles from the employee profiles separated are shortlisted as the first subset of employee profiles.

According to a further implementation of the described subject matter, a second subset of entity profiles may also be shortlisted from the first subset of entity profiles. In said implementation, the second subset of entity profiles may be shortlisted based on comparison of the first subset of entity profiles with a preliminary subset of entity profiles. The preliminary subset of entity profiles may be indicative of historic entity profiles or contrasting entity profiles. The historic entity profiles may be indicative of entity profiles that have demonstrated the occurrence of the event in past. Also, the contrasting entity profiles may be indicative of entity profiles having characteristics contrasting to the subset of characteristics associated with the first subset, thus, the contrasting entity profiles are indicative of entity profiles that have demonstrated the non-occurrence of the event. Further, the entity profiles within the second subset of entity profiles may, on one hand, show highest similarity with characteristics corresponding to the historic entity profiles comprising of the preliminary subset. Further, on the other hand, the entity profiles within the second subset of entity profiles may show lowest similarity with characteristics corresponding to the contrasting entity profiles comprising of the preliminary subset. Thus, the second subset of entity profiles have the highest probability of showing occurrence of the event, thus, the entities corresponding to the entity profiles in the second subset of entity profiles are predicted to show probable occurrence of the event in future. Further, factors that may amount to the occurrence of the event in future for the predicted entities are determined as a part of causal analysis.

According to an implementation, as a part of the causal analysis a comparison of the characteristics of the second subset of entity profiles may be done with the characteristics of the contrasting entity profiles. As a result of the comparison, the characteristics of the second subset of entity profiles having maximum dissimilarity with the characteristics of the contrasting entity profiles, may be indicative of the factors amounting to the occurrence of the event in future for the predicted entities.

In the example of employee attrition, as described above, subsequent to generation of a first subset of employee profiles, a calculated prediction may be made based on comparison of the employee profiles of the first subset with historic entity profiles, such as profiles of previously attrited employees, whereby a second subset of employees with the probability of attriting in future may be made. Further, a detailed analysis to determine probable causes for the attritions in future may also be done.

Thus, the present subject matter describes an improved predictive analysis model with a simplified prediction mechanism. Also, the described subject matter provides mechanism for customized analysis, based on each entity and user preferences.

The above techniques are further described with reference to FIG. 1 and FIG. 2. It should be noted that the description and the figures merely illustrate the principles of the present subject matter along with examples described herein and, should not be construed as a limitation to the present subject matter. It is, thus, understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 schematically illustrates a networked computing environment 100, implementing an event prediction system 102, according to an example implementation of the present subject matter. The networked computing environment 100 may either be a public distributed environment, or may be a private distributed environment. The pool of computing resources may include multiple computing resources 104-1, 104-2, 104-3, . . . , 104-N. For the sake of explanation, the computing resources 104-1, 104-2, 104-3, . . . , 104-N have been commonly referred to as the pool of computing resources 104, and have been individually referred to as computing resource 104.

The pool of computing resources 104 may communicate with the event prediction system 102, through a communication network 106. According to an example implementation of the present subject matter, the event prediction system 102 may be implemented as, but may not be limited to, a server, a workstation, a desktop computer, a laptop, a smart phone, a personal digital assistant (PDAs), a tablet, a virtual host, an application, and the like. Any communication link, as depicted between the pool of computing resources 104 and the communication network 106, or the computing device 102 and the communication network 106, may be enabled through a desired form of communication, for example, via dial-up modem connections, cable links, digital subscriber lines (DSL), wireless or satellite links, or any other suitable form of communication.

Similarly, each computing resource 104 within the pool of computing resources 104 may be implemented as, but is not limited to, a server, a workstation, a desktop computer, a laptop, a smart phone, a personal digital assistant (PDAs), tablet, a virtual host, an application, and the like. Further, each computing resource 104 may also be a machine readable instructions-based implementation or a hardware-based implementation or a combination thereof.

Further, the communication network 106 may be a wireless network, a wired network, or a combination thereof. The communication network 106 may also be an individual network or a collection of many such individual networks, interconnected with each other and functioning as a single large network, e.g., the internet or an intranet. The communication network 106 may be implemented as one of the different types of networks, such as intranet, local area network (LAN), wide area network (WAN), and such. The communication network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The communication network 106 may also include individual networks, such as, but are not limited to, Global System for Communication (GSM) network, Universal Telecommunications System (UMTS) network, Long Term Evolution (LTE) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the implementation, the communication network 108 may include various network entities, such as, base stations, gateways and routers; however, such details have been omitted to maintain the brevity of the description. Further, it may be understood that the pool of computing resources 104, the computing devices 102, and other entities may take place based on the communication protocol compatible with the communication network 106.

The event prediction system 102 may also include processor(s) 110 and interface(s) 112. The processor(s) 110 may be implemented as microprocessor(s), microcomputer(s), microcontroller(s), digital signal processor(s), central processing unit(s), state machine(s), logic circuit(s), and/or any device(s) that manipulates signals based on operational instructions. Among other capabilities, the processor(s) 110 may fetch and execute computer-readable instructions stored in a memory. The functions of the various elements shown in the figure, including any functional blocks labeled as "processor(s)", may be provided through the use of dedicated hardware as well as hardware capable of executing machine readable instructions.

The interface(s) 112 may include a variety of machine readable instructions-based interfaces and hardware interfaces that allow the computing device 102 to interact with different other computing resources 104 and user. Further, the interface(s) 112 may enable the computing device 102 to communicate with other communication and computing devices, such as network entities, web servers, and external repositories.

Further, the event prediction system 102 may include a memory 114, communicatively coupled to the processor(s) 110. The memory 114 may include any computer-readable medium including, for example, volatile memory (e.g., RAM), and/or non-volatile memory (e.g., EPROM, flash memory, Memristor, etc.). Further, the computing device 102 may include module(s) 116 and data 118. The module(s) 116 may be communicatively coupled to the processor(s) 110. The module(s) 116, amongst other things, include routines, programs, objects, components, data structures, and the like, which perform particular tasks or implement particular abstract data types. The module(s) 116 further include modules that supplement applications on the computing device 102, for example, modules of an operating system. The data 118 serves, amongst other things, as a repository for storing data that may be fetched, processed, received, or generated by the module(s) 116. Although the data 118 is shown internal to the computing device 102, it may be understood that the data 118 may reside in an external repository in the computing resources 104, which may be communicatively coupled to the computing device 102. The computing device 102 may communicate with the external repository through the interface(s) 112 to obtain information from the data 118.

In an implementation, the module(s) 116 of the computing device 102 may include a profile creation module 120, a discovery module 122, a predictive analysis module 124, a causal analysis module 126, a preventive analysis module 128, and other module(s) 130. The other module(s) 130 may include programs or coded instructions that supplement applications and functions, for example, programs in the operating system of the computing device 102, and the other data fetched, processed, received, or generated by the other module(s) 130.

In an implementation of the present subject matter, the profile creation module 120 may be configured to gather data corresponding to multiple entities to derive multiple entity profiles of entity profiles. Here, each entity profile corresponds to an entity from amongst the multiple entities. Also, the gathered data for the multiple entities may be a representative of characteristics associated with the multiple entities.

In accordance with another implementation of the present subject matter, the discovery module 122 may be configured to identify a first subset of entity profiles from amongst the multiple entity profiles derived by the profile creation module 120. The first subset of entity profiles may be identified based on a subset of the characteristics associated with the multiple entities, in combination with a predetermined threshold limit. Next, the predictive analysis module 124 may be configured to predict entity profiles with a probability of demonstrating occurrence of the event. The entity profiles with a probability of demonstrating the occurrence of the event may be regarded as a second subset of entity profiles. Here, the second subset of entity profiles may be derived from amongst the first subset of entity profiles, based on comparison of the first subset of entity profiles with a preliminary subset of entity profiles. The entities in the second subset of the entity profiles have highest probability of demonstrating the occurrence of the event.

In an implementation of the present subject matter, the causal analysis module 126 may be configured to determine, factors contributing to occurrence of the event for each entity within the second subset of entity profiles. As a part of the causal analysis a comparison of the characteristics of the second subset of entity profiles may be done with the characteristics of the contrasting entity profiles. As a result of the comparison, the characteristics of the second subset of entity profiles having maximum dissimilarity with the characteristics of the contrasting entity profiles, may be indicative of the factors amounting to the occurrence of the event in future for the predicted entities.

In accordance with an illustrative implementation of the present subject matter, the preventive analysis module 128 may generate a prevention plan based on the factors determined for each entity profile of the second subset of entity profiles.

For example, if an employee in an organization is considered as an entity and attrition of the employee as occurrence of event, then data related to the employee is gathered by profile creation module 120. Here, the data related to the employee may be education, skill, and career growth, and the like related to the characteristics like academic, and work, of the entity. The data gathered is kept as diverse and as detailed as possible, so that all major events in work-life of an employee is covered. The profile creation module 120 may further generate profile corresponding to each employee using the data gathered, thus, multiple employee profiles are generated. The profile associated with an entity, that is, employee in this example, may consist of characteristics education background, type or nature of projects, technology profile, and the like.

In an implementation of the present subject matter, the attributes like gap between promotions, performance change over time, may be derived for the employee from the employee profile, by the profile creation module 120. Next, the discovery module 122 may identify a first subset of employee profiles from amongst the multiple employee profiles. In an example, for identifying the first subset of employee profiles following steps may be done by the discovery module 122:

First, employee profiles showing some repeated pattern like spike in third quarter of every year, the mapping employees in current quarter are identified. (These employees are exclusive to the group and should not fall in any relevant high retention group), thus an employee set satisfying the above pattern are obtained, with employees e1, e2, e3, . . . , eN. Next, for the employees in the employee set, relevant subsets showing high retention in two categories may be identified. For example, employees showing more than 90% retention in Intra Independent Operating Unit (IOU) and Inter IOU are identified. Here, an IOU may be specific organizational unit, the IOU can be Insurance IOU, This comparison of relevancy is based on semantic attributes, such as age, designation, experience (global semantics) and project type, technology etc. (local semantics based on the nature of the group). In an implementation, the Global Semantics are given higher weightage than local semantics.

So, subsets with same designation or age or experience may be assigned higher relevance score over subset with same project type. For illustration, suppose, one high attrition subset with attrition more than 20% is such that the desired characteristics of employee is age is between 25-30, designation is System Engineer (Sys.Engg), IOU is Corporate Technology Office (CTO) and current band is C. Next, three high retention subsets with retention above 95% are identified, such that:

Subset A has employees with age between 25-30 years, designation is Sys.Engg, IOU is CTO and current band is A, along with role as Researcher, Subset B has employees with age between 35-40 years, designation is Senior Consultant, IOU is CTO and current band is B, along with role as Group Leader (GL), and Subset C has employees with age between 25-30 years, designation is ITA, IOU is BFS and current band is C, along with onsite months as 24.

In this case, subset A is considered as most relevant (because of extent of overlap with attrition subset in terms of semantic attributes, age and designation in this case) and C as less relevant and B as least relevant to suggest actions for retaining the employee group falling in X.

The predictive analysis module 124 identifies two sets of retention subsets, such that, in Set 1 different retention sets are in the same IOU and in Set 2 different retention sets are in other IOU.

Further, for the employee set identified by discovery module 122, for each employee the CURRENT ROLE, TECHNOLOGY AREA, PROJECT TYPE, CUSTOMER and the like, of the employee and relevant sets (having similar role) from the Set1 and Set2 (which are relevant based on global semantics) may be determined by the predictive analysis module 124.

For determination of each of the above characteristic, two recommendations are available. For instance, if role of an employee is "Developer" in IOU="Hi-Tech", the predictive analysis module 124 would determine for retention sets in Set1 (set of relevant retention sets in same IOU for which this employee is part of) and Set2 (different IOU's). Next, a delta is determined, which is an indicative of Satisfaction Measure. The Employee satisfaction measure indicates the attribute and values contributing to higher retention. For example, onsite_months=24 is the Satisfaction measure in the case C. For case B a developer with App_Area='Informatica' is more satisfied employee as compared to employee with App_Area='Java'. Further let the underlying first subset (attrition) identified by the discovery module 122, X-"Age=25-30 and designation=Sys.Engg and IOU=Hi-Tech and current band='C' and APP_Area="JAVA" and three relevant high retention subsets (95%+retention) from same IOU, are discovered.

A-"Age=25-30 and designation=Sys.Engg and IOU=Hi-Tech and current band='A' and role='Business Analyst'"

B-"Age=35-40 and designation=Sys.Engg and IOU=Hi-Tech and Current Band='B' and APP_Area='Informatica' and role='Developer'"

C-"Age=25-30 and designation=Sys.Engg and IOU=Hi-Tech and role="Test Analyst" and onsite_months=24"

So for an employee falling in X, if the role is developer, then B is considered to calculate delta and suggest that similar employees (based on global semantics, age and designation) in the IOU with similar role if given higher band were retained or if APP AREA is changed, they may be retained. Similarly for any other employee with role as Test Analyst, Onsite would be suggested.

Thus recommendations, based on role similarity (intra IOU and inter IOU), technology area similarity, customer similarity, and project type similarity are provided, suggesting up to maximum of eight suggestions for improving satisfaction for each employee in the attrition subset.

These steps are repeated for each subset, thus customized suggestions for each employee of a subset can be discovered with most relevant actionable items for retention.

For example, the present subject matter may be used to identify preferences in cars.

For Car Make Related Database, Car Make Data Attributes

| Name of attribute | Set of values for attribute | | | |
|---|---|---|---|---|
| Buying | Low | Medium | high | Very high |
| Maintenance | Low | Medium | high | Very high |
| Doors | 2 | 3 | 4 | 5 or more |
| Persons | 2 | 4 | more | |
| Boot-size | Small | Medium | big | |
| Safety | High | Low | Medium | |
| Flag | low - 0 | high - 1 | | |

Here, the number of cars rated low may be 1210 and number of cars rated high may be 518

Further, the discovered interesting subsets for cars rated low and rated high with common characteristics, following set of characteristics may be considered:

For Cars Rated Low

| INTERESTING_SUBSET | No of car makes | % interesting |
|---|---|---|
| persons = more and Safety = med and bootsize = small | 64 | 76.563 |

For Cars Rated High

| persons = more and Safety = high and bootsize = big | 63 | 80.952 |

Here, if the car has medium or high safety and has 5 or more person capacity, then high boot size cars are preferred. (allowing for high or medium safety as equitable)

For Cars Rated Low

| INTERESTING_SUBSET | No of car makes | % interesting |
|---|---|---|
| Safety = med and persons = more and bootsize = small | 64 | 76.563 |

For Cars Rated High

| Safety = med and persons = more | 192 | 57.813 |

Here, if the car has high safety and has 5 more person capacity, then high or medium boot size cars are preferred.

For Cars Rated Low

| INTERESTING_SUBSET | No of car makes | % interesting |
|---|---|---|
| Safety = med and persons = more and bootsize = small | 64 | 76.563 |

For Cars Rated High

| | No of car makes | % interesting |
|---|---|---|
| Safety = high and persons = 4.0 and bootsize = small | 64 | 81.25 |

Here, if the boot size of a car is small then high safety cars are preferred in case of 4 or more person capacity (allowing for 4 or more as equitable).

Further, the causal analysis of the above mentioned subsets may generate the following:

| Name of attribute | Set of values for attribute | | | | No of distinct values | Possible values of attribute for rules |
|---|---|---|---|---|---|---|
| Buying | Low | Med | high | vhigh | 4 | 5 |
| Maint | Low | Med | high | vhigh | 4 | 5 |
| Doors | 2 | 3 | 4 | 5more | 4 | 5 |
| Persons | 2 | 4 | more | | 3 | 4 |
| Bootsize | Small | Med | big | | 3 | 4 |
| Safety | High | Low | med | | 3 | 4 |
| Flag | low - 0 | high - 1 | | | | |
| | | | | Multiplication | | 8000 |
| Total interesting sets/combinations possible = | | | | | | 7999 (1 reduced for all nil values) |

Thus, for the car database, there are as many as 7999 subsets possible for evaluation. In case of a human going through these combinations for analysis will be very time consuming. The causal analysis however, provides for these results in few minutes. Hence, compared to human beings it is very fast, efficient and error-proof.

Figure 2:
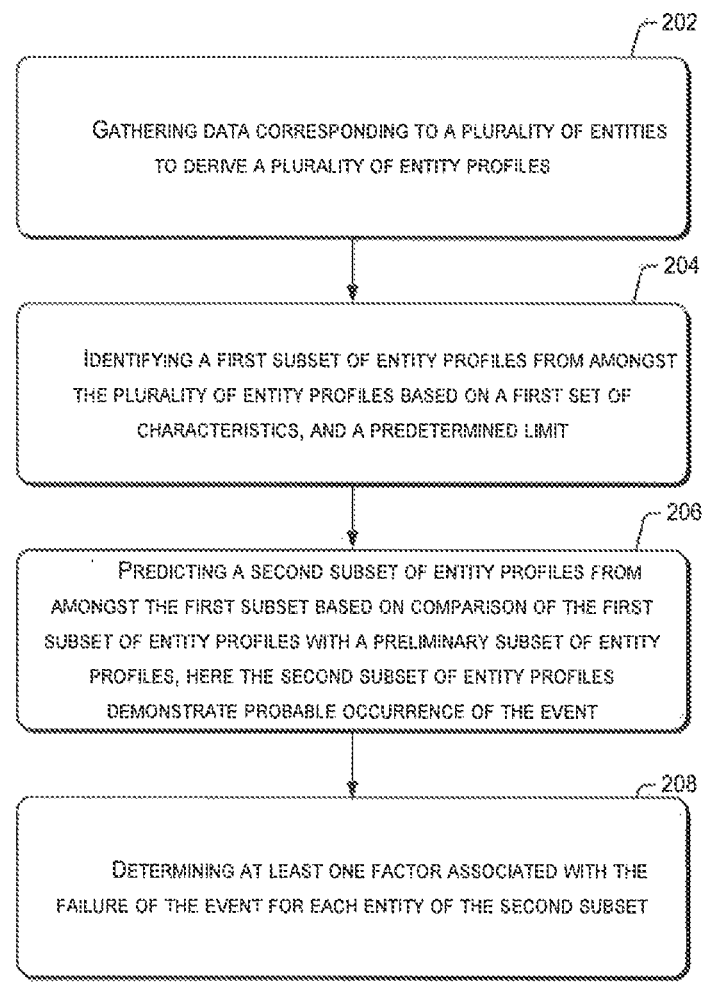
FIG. 2 illustrates a method for determining factors contributing to occurrence of an event, according to an implementation of the present subject matter.

FIG. 2 illustrates method 200 for determining factors contributing to occurrence of an event associated with an entity, according to an implementation of the present subject matter. The order in which the method 200 is described is not intended to be construed as a limitation, and any number of the described method blocks may be combined in any order to implement the method 200 or an alternative methods. Furthermore, the method 200 may be implemented by processor(s) or computing device(s) through any suitable hardware, non-transitory machine readable instructions, or combination thereof.

It may be understood that steps of the method 200 may be performed by programmed computing devices. The steps of the method 200 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

Further, although the method 200 may be implemented in a variety of computing device of networked computing environment; in an example implementation of FIG. 2, the method 200 may be explained in context of aforementioned computing device 102 of the networked computing environment 100, for ease of explanation.

Referring to FIG. 2, in an example implementation of the present subject matter, at block 202, data associated with multiple entities may be gathered, and processed to derive multiple entity profiles of entity profiles. Here, each entity profile may be associated with an entity from amongst the multiple entities. Also, the gathered data for the multiple entities may be a representative of characteristics associated with the multiple entities.

At block 204, a first subset of entity profiles, from amongst the multiple entity profiles derived at block 202, may be identified. The first subset of entity profiles may be identified based on a subset of the characteristics associated with the multiple entities, in combination with a predetermined threshold limit.

At block 206, entity profiles, with a probability of demonstrating occurrence of the event, are predicted. The entity profiles, with a probability of demonstrating the occurrence of the event, may be regarded as a second subset of entity profiles. Here, the second subset of entity profiles may be derived from amongst the first subset of entity profiles, based on comparison of the first subset of entity profiles with a preliminary subset of entity profiles. The preliminary subset of entity profiles may be indicative of historic entity profiles or contrasting entity profiles. The historic entity profiles may be indicative of entity profiles that have demonstrated the occurrence of the event in past. Also, the contrasting entity profiles may be indicative of entity profiles having characteristics contrasting to the subset of characteristics associated with the first subset, thus the contrasting entity profiles are indicative of entity profiles that have demonstrated the non-occurrence of the event. Further, the entity profiles within the second subset of entity profiles may, on one hand, show highest similarity with characteristics corresponding to the historic entity profiles comprising of the preliminary subset. Further, on the other hand, the entity profiles within the second subset of entity profiles may show lowest similarity with characteristics corresponding to the contrasting entity profiles comprising of the preliminary subset.

At block 208, factors contributing to occurrence of the event for each entity within the second subset of entity profiles may be determined.

Although implementations of event prediction in a networked environment have been described in language specific to structural features and/or methods, it is to be understood that the present subject matter is not necessarily limited to the specific features or methods described. Rather, the specific features and methods are disclosed and explained in the context of a few implementations for event prediction in a networked environment.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having,"

"containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor-implemented method for determining factors contributing to occurrence of an event, the method comprising:
    gathering, via one or more hardware processors, data corresponding to a plurality of entities from an enterprise workflow automation system and repository to derive a plurality of entity profiles, wherein the data represents characteristics associated with entities and each entity from amongst the plurality of entities is associated with a profile from amongst the plurality of entity profiles and provides a wider coverage of the characteristics for consideration, and the gathered data is diverse to cover the event associated with each entity, wherein the entity refer to an employee, the event associated with the employee is attrition, and the characteristics associated with the employee includes education, project worked, location, performance, and skills, wherein the characteristics associated with the employee includes categories comprising personal, academic, professional, and also provides a capability to customize collection of data corresponding to the employee, wherein each of the categories include multiple subcategories and each of the subcategory vary for the employee in accordance with a number of experience in years of the employee;
    identifying, via one or more hardware processors, a first subset of entity profiles from amongst the plurality of entity profiles by comparing the characteristics associated with the employee including project worked, location in the entity profiles and historical trends derived from the gathered data and employee profiles with closest map of characteristics are separated and based on analysis of a first set of characteristics with repeated pattern in a predetermined limit, the employee profiles are shortlisted as the first subset of entity profiles, wherein subsequent to identification of the first subset of entity profiles, a prediction based on comparison of the employee profiles of the first subset of entity profiles with historic entity profiles including profiles of previously attrited employees is computed;
    predicting, via one or more hardware processors, a second subset of entity profiles from amongst the first subset of entity profiles based on comparison of relevancy of the first subset of entity profiles with a preliminary subset of entity profiles in accordance with semantic attributes of global semantics including age, designation, experience of the employee and local semantics including a project type, technology area associated with the employee, wherein the global semantics are assigned higher weightage than the local semantics, wherein the second subset of entity profiles with same designation or same age or same experience are assigned highest weightage over the second subset of entity profiles with same project type or same technology and further identify sets of retention subsets with age, current role, technology area, project type, customer, an intra independent operating unit (IOU) and an inter IOU, wherein the second subset of entity profiles are demonstrative of probable occurrence of an event and show highest similarity with characteristics corresponding to the historic entity profiles and show lowest similarity with characteristics corresponding to contrasting entity profiles, wherein the entities in the second subset of entity profiles have highest probability of demonstrating the occurrence of the event and a delta is determined between the sets of retention subsets to determine value contributing to the retention, wherein the contrasting entity profiles corresponds to the entity profiles that demonstrate an non-occurrence of the event, wherein the second subset of entity profiles are assigned with higher relevancy scores over the first set of entity profiles;
    determining, via one or more hardware processors, for each entity profile within the second subset of entity profiles, at least one factor contributing to the occurrence of the event in future by a causal analysis, wherein the causal analysis for the second subset of entity profiles generate attributes and a set of values for the attributes associated with the event; and
    providing suggestions for each entity of the first subset of entity profiles and the second subset of entity profiles based on similarity in roles in both the intra IOU and the inter IOU, similarity in technology area, similarity in customer, similarity in the project type with relevant actionable item for the event, wherein the suggestions for each employee is discovered with relevant actionable item for retention including promotion or a change in technology area.

2. The method of claim 1, wherein the method further comprises generating a causal report based on the at least one factor.

3. The method of claim 2, further comprising generating a prevention plan for the occurrence of the event based on the causal report.

4. The method of claim 3, wherein the generation of the prevention plan for the second subset of entities comprises:
    analyzing the factors in the causal report to identify similar causal factors for each entity profile in the second subset; and
    preparing the prevention plan for the occurrence of the event, wherein the prevention plan is a list of corrective measures to be used to prevent the occurrence of the event.

5. The method of claim 1, wherein the predetermined limit is received from a user.

6. The method of claim 5, wherein the predetermined limit is a predetermined threshold value.

7. The method of claim 5, wherein the predetermined limit is a predetermined range of values.

8. The method of claim 1, wherein the preliminary subset of entity profiles is a subset of the historic entity profiles stored in a repository.

9. The method of claim 8, wherein the historic entity profiles are demonstrative of occurrence of the event in past.

10. The method of claim 1, wherein the preliminary subset of entity profiles is a subset of entity profiles demonstrating characteristics contrasting to the characteristics of the first subset of entity profiles.

11. The method of claim 1, wherein the determining for each entity profile within the second subset of entity profiles, at least one factor contributing to the occurrence of the event in future comprising:
  comparing, the characteristics of the second subset of entity profiles with the characteristics of the contrasting entity profiles; and
  identifying, characteristics of the second subset of entity profiles with maximum dissimilarity with the characteristics of the contrasting entity profiles indicative of the at least one factor contributing to the occurrence of the event in future.

12. An event prediction system associated with the event, comprises:
  a processor having,
    a profile creation module, to
      gather data corresponding to a plurality of entities from an enterprise workflow automation system and repository to derive a plurality of entity profiles, wherein the data represents characteristics associated with entities and each entity from amongst the plurality of entities is associated with a profile from amongst the plurality of entity profiles and provides a wider coverage of the characteristics for consideration, and the gathered data is diverse to cover the event associated with each entity, wherein the entity refer to an employee, the event associated with the employee is attrition, and the characteristics associated with the employee includes education, project worked, location, performance, and skills, wherein the characteristics associated with the employee includes categories comprising personal, academic, professional, and also provides a capability to customize collection of data corresponding to the employee, wherein each of the categories include multiple subcategories and each of the subcategory vary for the employee in accordance with a number of experience in years of the employee;
    a discovery module, to identify a first subset of entity profiles from amongst the plurality of entity profiles by comparing the characteristics associated with the employee including project worked, location in the entity profiles and historical trends derived from the gathered data and employee profiles with closest map of characteristics are separated and based on analysis of a first set of characteristics with repeated pattern in a predetermined limit, the employee profiles are shortlisted as the first subset of entity profiles, wherein subsequent to identification of the first subset of entity profiles, a prediction based on comparison of the employee profiles of the first subset of entity profiles with historic entity profiles including profiles of previously attrited employees is computed;
    a predictive analysis module, to
      predict a second subset of entity profiles from amongst the first subset of entity profiles based on comparison of relevancy of the first subset of entity profiles with repository preliminary subset of entity profiles in accordance with semantic attributes of global semantics including age, designation, experience of the employee and local semantics including a project type, technology area associated with the employee, wherein the global semantics are assigned higher weightage than the local semantics, wherein the second subset of entity profiles with same designation or same age or same experience are assigned highest weightage over the second subset of entity profiles with same project type or same technology area and further identify sets of retention subsets with age, current role, technology area, project type, customer, an intra independent operating unit (IOU) and an inter IOU, wherein the second subset of entity profiles are demonstrative of probable occurrence of an event and show highest similarity with characteristics corresponding to the historic entity profiles and show lowest similarity with characteristics corresponding to contrasting entity profiles, wherein the entities in the second subset of entity profiles have highest probability of demonstrating the occurrence of the event and a delta is determined between the sets of retention subsets to determine value contributing to the retention, wherein the contrasting entity profiles corresponds to the entity profiles that demonstrate an non-occurrence of the event, wherein the second subset of entity profiles are assigned with higher relevancy scores over the first set of entity profiles;
    a causal analysis module, to
      determine, for each entity profile within the second subset of entity profiles, at least one factor contributing to the occurrence of the event by a causal analysis, wherein the causal analysis for the second subset of entity profiles generate attributes and a set of values for the attributes associated with the event; and
      provide suggestions for each entity of the first subset of entity profiles and the second subset of entity profiles based on similarity in roles in both the intra IOU and the inter IOU, similarity in customer, similarity in technology area, similarity in the project type with relevant actionable item for the event, wherein the suggestions for each employee is discovered with relevant actionable item for retention including promotion or a change in technology area.

13. The system of claim 12, further comprising a preventive analysis module to generate a prevention plan for the occurrence of the event, wherein the prevention plan is based on a causal report, wherein the causal report consists of at least one factor contributing to the occurrence of the event.

14. The system of claim 13, wherein the generation of the prevention plan comprises:
  analyzing the factors in the causal report to identify similar causal factors for each entity profile in the second subset; and
  preparing the prevention plan for the occurrence of the event, wherein the prevention plan is a list of corrective measures to be used to prevent the occurrence of the event.

15. The system of claim 12, wherein the preliminary subset of entity profiles is a subset of the historic entity profiles stored in a repository.

16. The system of claim 12, wherein the preliminary subset of entity profiles is a subset of entity profiles demonstrating characteristics contrasting to the characteristics of the first subset of entity profiles.

17. A non-transitory computer-readable medium having embodied thereon a computer program for executing a method for determining factors contributing to occurrence of an event, the method comprising:

gathering, via one or more hardware processors, data corresponding to a plurality of entities from an enterprise workflow automation system and repository to derive a plurality of entity profiles, wherein the data represents characteristics associated with entities and each entity from amongst the plurality of entities is associated with a profile from amongst the plurality of entity profiles and provides a wider coverage of the characteristics for consideration, and the gathered data is diverse to cover the event associated with each entity, wherein the entity refer to an employee, the event associated with the employee is attrition, and the characteristics associated with the employee includes education, project worked, location, performance, and skills, wherein the characteristics associated with the employee includes categories comprising personal, academic, professional, and also provides a capability to customize collection of data corresponding to the employee, wherein each of the categories include multiple subcategories and each of the subcategory vary for the employee in accordance with a number of experience in years of the employee;

identifying, via one or more hardware processors, a first subset of entity profiles from amongst the plurality of entity profiles by comparing the characteristics associated with the employee including project worked, location in the entity profiles and historical trends derived from the gathered data and employee profiles with closest map of characteristics are separated and based on analysis of a first set of characteristics with repeated pattern in a predetermined limit, the employee profiles are shortlisted as the first subset of entity profiles, wherein subsequent to identification of the first subset of entity profiles, a prediction based on comparison of the employee profiles of the first subset of entity profiles with historic entity profiles including profiles of previously attrited employees is computed;

predicting, via one or more hardware processors, second subset of entity profiles from amongst the first subset of entity profiles based on comparison of relevancy of the first subset of entity profiles with repository preliminary subset of entity profiles in accordance with semantic attributes of global semantics including age, designation, experience of the employee and local semantics including a project type, technology area associated with the employee, wherein the global semantics are assigned higher weightage than the local semantics, wherein the second subset of entity profiles with same designation or same age or same experience are assigned highest weightage over the second subset of entity profiles with same project type or same technology area and further identify sets of retention subsets with age, current role, technology area, project type, customer, an intra independent operating unit (IOU) and an inter IOU, wherein the second subset of entity profiles are demonstrative of probable occurrence of an event and show highest similarity with characteristics corresponding to the historic entity profiles and show lowest similarity with characteristics corresponding to contrasting entity profiles, wherein the entities in the second subset of entity profiles have highest probability of demonstrating the occurrence of the event and a delta is determined between the sets of retention subsets to determine value contributing to the retention, wherein the contrasting entity profiles corresponds to the entity profiles that demonstrate an non-occurrence of the event, wherein the second subset of entity profiles are assigned with higher relevancy scores over the first set of entity profiles;

determining, via one or more hardware processors, for each entity profile within the second subset of entity profiles, at least one factor contributing to the occurrence of the event by a causal analysis, wherein the causal analysis for the second subset of entity profiles generate attributes and a set of values for the attributes associated with the event; and providing, via one or more hardware processors, suggestions for each entity of the first subset of entity profiles and the second subset of entity profiles based on similarity in roles in both the intra IOU and the inter IOU, similarity in technology area, similarity in customer, similarity in the project type with relevant actionable item for the event, wherein the suggestions for each employee is discovered with relevant actionable item for retention including promotion or a change in technology area.

18. The non-transitory computer-readable medium of claim 17, wherein the method further comprises generating a causal report based on the at least one factor.

19. The non-transitory computer-readable medium of claim 17, further comprises generating a prevention plan for the occurrence of the event based on the causal report.

20. The non-transitory computer-readable medium of claim 19, wherein the generation of the prevention plan for the second subset of entities comprises:

analyzing the factors in the causal report to identify similar causal factors for each entity profile in the second subset; and preparing the prevention plan for the occurrence of the event, wherein the prevention plan is a list of corrective measures to be used to prevent the occurrence of the event.

* * * * *